Dec. 3, 1963  A. BÜRGER  3,112,577
CARRYING AND PLANTING PLATE FOR BULBS AND THE LIKE
Filed June 24, 1960
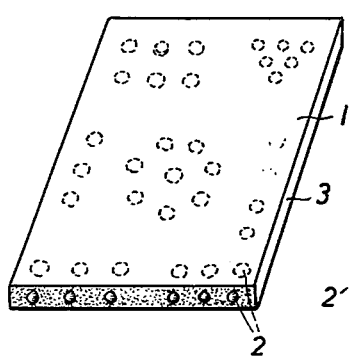
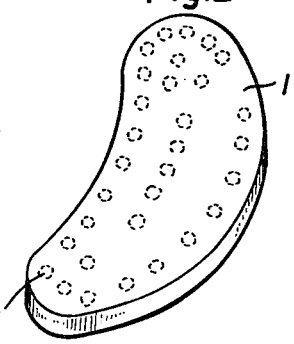
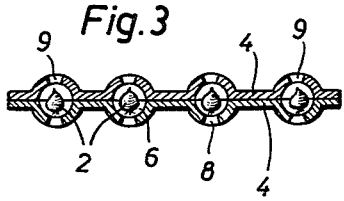
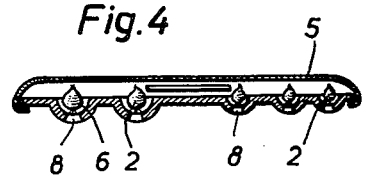
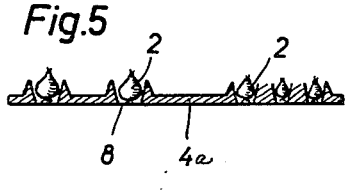
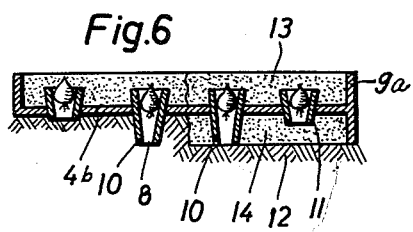
INVENTOR
BY

United States Patent Office 3,112,577
Patented Dec. 3, 1963

3,112,577
CARRYING AND PLANTING PLATE FOR BULBS AND THE LIKE
Adolf Bürger, Heideckstrasse 24, Krefeld, Germany
Filed June 24, 1960, Ser. No. 38,609
Claims priority, application Germany July 1, 1959
8 Claims. (Cl. 47—37)

The invention relates to a method and device for planting flower bulbs in decorative or flower gardens or the like.

For arranging flower gardens, hitherto different types of flower bulbs have been individually bought and individually planted. Often the first difficulty in planting is the fact that different types of flower bulbs and—in the case of uniform bulbs—the colour of the flowers cannot be kept apart, the result in the majority of cases being a colour arrangement which does not harmonise and also which is not required. In addition to these difficulties the planting of flower bulbs requires skilled treatment, as the bulbs can only be planted at certain seasons of the year, and also different conditions must be complied with e.g. suitable soil for the flowers and, in particular, suitable moisture content of the soil. Also different types of bulbs require different manures. Thus large numbers of people who love flowers, but who for different reasons do not have the requisite knowledge of the subject, cannot undertake to plant flower bulbs without a great risk.

The invention is of value in that the work of laying-out a flower garden is facilitated for flower-experts and aids large numbers of people who are without the technical knowledge otherwise necessary to lay out a self-planted flower garden corresponding to their feelings and ideas. According to the invention, one object is to arrange the bulbs in pre-determined and fixed positions on or in a bulb carrying plate and to plant them in the earth together with the bulb carrying plate, then to destroy the bulb carrying plate by the action of moisture, in particular of water.

A second object of the invention is that by the arrangement of the bulbs in pre-determined positions on or in a carrying plate, the planting of the bulbs is substantially aided, as now a flat hollow has to be formed in the earth and a plurality of bulbs laid in, all in a single operation. The arrangement of different types of flower bulbs in the bulb carrying plate according to a pre-determined flower-, colour-, and space-pattern ensures the required flower arrangement. The bulb carrying plate itself can have any shape desired, such as rectangular, square, etc. A further advantage resides in the fact that the bulb carrying plate preferably is adapted to the conditions corresponding to the needs of the plants concerned and may include weed-free soil, and thus the otherwise necessary weeding operation is unnecessary.

The carrying plate suitably consists of a material decomposing under the action of moisture and has recesses or depressions for receiving different bulbs at pre-determined positions.

A further object is to provide a bulb carrying plate where there is obtained an effective check on the size of the bulbs when they are planted and by the arrangement of an opening leading to the earth below the bulbs they can grow in the earth before decomposition of the plate is completed. Receiving chambers in the plate can also be adapted to the type of bulb in each case e.g. bulbs for tulips, narcissi, croci, gladiolae, scilla, muscari, ornithogalum, and lilies.

This last object is of particular importance for lilies, which need an effective water draft and therefore are placed in a long funnel so that there is present a sufficient air gap between bulbs and earth. The thin bulb carrying plate can also have a soil- or manure-layer above and/or below the base plate. Finally the bulb carrying plate is provided with a picture of the subsequent flower layout.

The invention is hereinafter further described with reference to the accompanying drawings, wherein:

FIGURE 1 is a perspective view of the supporting plate, partial section of the plate also being shown.

FIGURE 2 is a perspective view of the supporting plate in the shape of a palette.

FIGURE 3 is a section through a supporting plate consisting of two parts.

FIGURE 4 is a section through a supporting plate with bulbs laid therein, and a transparent foil covering said bulbs.

FIGURE 5 is a section through a supporting plate with receiving chambers adapted to the size of the bulbs.

FIGURE 6 is a section through a composite supporting plate.

The bulb-carrying plate according to FIGURE 1 consists of a rectangular element formed from loosely compressed material such as earth from the flower garden, turf or the like, and having flower bulbs 2 of different kinds arranged therein at pre-determined positions. The bulb-carrying plate can be strengthened at its side edges 3 by wood or synthetic material frame pieces (not shown in the drawings) and it can be otherwise enclosed in nonbreakable manner. In FIGURE 2 the bulb carrying plate has the shape of a pallette, but it can have any other required shape and size. In FIGURES 3 and 6 the bulb carrying plate consists of a thin-walled plate 4, 4a or 4b of adequate resistance to deformation and, for example, made of pulpy material, turf, cow dung or the like, and may contain silica gel or other inert moisture attracting substances; said plate 4 has recesses or receiving chamber 6 provided for laying-in the bulbs 2. These receiving chambers have openings 8 leading to the earth beneath, so that the bulbs can start growing in the ground before the complete decomposition of the carrying plate. As shown in FIGURE 3, the bulb carrying plate consists of an upper and lower plate, both of these approximately resembling one another; the upper plate is also suitably provided with openings, designated by 9, in the cups of the receiving chambers. According to FIGURE 4 the bulb carrying plate with the bulbs laid therein is covered by a transparent foil 5 which at the same time ensures that the bulbs will not fall out. Under the transparent foil there is placed a picture of the subsequent lay-out of the flowers.

As shown in FIGURE 5, the receiving chambers—which are shaped like funnels, project from the base plate 4a, and are of different widths—are adapted to the size of the individual bulbs. As shown in FIGURE 6, the bulb carrying plate consists of the base plate 4b having the lateral raised edge 9a extending around it, and the funnels 10 and 11, inserted into bores of the plate, for receiving the flower bulbs. The funnels 10 have long necks so that according to the individual needs of the bulbs, but particularly in the case of lily bulbs, adequate provision is made for drawing off water. The bulb carrying plate may have an additional layer of soil 13 and 14 or the like above and/or below it, it being possible for said layer to contain the appropriate manure.

I therefore claim:

1. A flat recessed bulb carrying plate of material decomposable under the action of moisture and having funnel-shaped bulb receiving chambers of different sizes located in predetermined positions on said flat plate, said plate lying generally above bulbs placed in said recesses, dung material in said plate, said funnel-shaped receiving chambers each corresponding to the size of a bulb to be laid therein and of a size corresponding to the growing conditions of the bulb, and said receiving chambers also projecting upwards from said plate.

2. A flat recessed bulb carrying device of material decomposable under the action of moisture, comprising a base plate, downwardly extending, open bottomed funnel-shaped bulb receiving chambers in said plate and a soil layer located above said base plate, said receiving chambers being located in predetermined positions on said plate, dung material contained in said plate, and said funnel-shaped receiving chambers each corresponding in diameter and vertical length to the growth characteristics and to the size of the bulb of a species of flower to be laid therein, said receiving chambers projecting upwards from the plane of said base plate and each having an opening leading to the ground.

3. A flat recessed plate of material decomposable under the action of moisture including dung material and moisture absorbing silica gel and adapted to support a plurality of bulbs or the like, for planting, the recesses in said plate being of various sizes and located in predetermined positions on said plate, said plate lying generally above bulbs placed in said recesses, a layer adapted to be arranged above bulbs placed in said recesses, said recesses each being provided with an opening in the bottom.

4. A flat bulb carrying plate according to claim 3, wherein said recesses are funnel-shaped, being narrow at their lower end.

5. A flat recessed plate of material decomposable under the action of moisture and adapted to support a plurality of flower bulbs or the like, for planting, the recesses in said plate being of various sizes and located in predetermined positions on said plate, a layer adapted to be arranged above bulbs placed in said recesses, said recesses being funnel-shaped and protruding below the bottom surface of said plate.

6. A plate according to claim 5, wherein said material decomposable under the action of moisture contains fertilizer.

7. A plate according to claim 5, wherein said material decomposable under the action of moisture contains moisture attracting minerals.

8. A flat recessed bulb carrying device of material decomposable under the action of moisture, comprising a base plate, downwardly extending open bottomed funnel-shaped receiving chambers in said plate, said receiving chambers being located in predetermined positions on said plate and said funnel-shaped receiving chambers each corresponding in diameter and vertical length to the size and growth characteristics of the bulb of the species of flower to be placed therein, said receiving chambers projecting upwardly from the plane of said base plate, and each having an opening in the bottom.

References Cited in the file of this patent
UNITED STATES PATENTS

| | | |
|---|---|---|
| 220,896 | Wolferts | Oct. 21, 1879 |
| 526,512 | Weber et al. | Sept. 25, 1894 |
| 776,246 | Kanst | Nov. 29, 1904 |
| 1,446,113 | Blackwell | Feb. 20, 1923 |
| 1,486,431 | Harvey | Mar. 11, 1924 |
| 1,880,136 | Hickok | Sept. 27, 1932 |
| 1,882,713 | Angier | Oct. 18, 1932 |
| 2,143,468 | Avery | Jan. 10, 1939 |
| 2,648,165 | Nestor | Aug. 11, 1953 |
| 2,785,969 | Clawson | Mar. 19, 1957 |
| 2,893,168 | Kobs | July 7, 1959 |

FOREIGN PATENTS

| | | |
|---|---|---|
| 74,703 | Austria | Sept. 25, 1918 |
| 105,893 | Great Britain | May 3, 1917 |
| 641,280 | Great Britain | Aug. 9, 1950 |

OTHER REFERENCES

Condensed Chemical Dictionary, Fifth Edition, published by Reinhold (N.Y.), 1956. (Page 24 is relied on.)